May 29, 1951 V. A. RYAN ET AL 2,554,639
CLOSURES
Filed Nov. 1, 1948
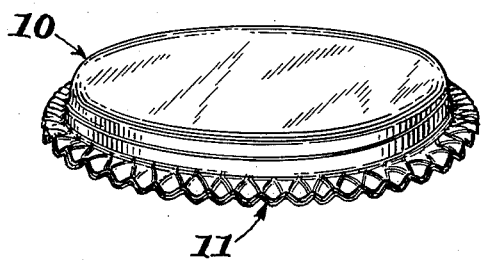
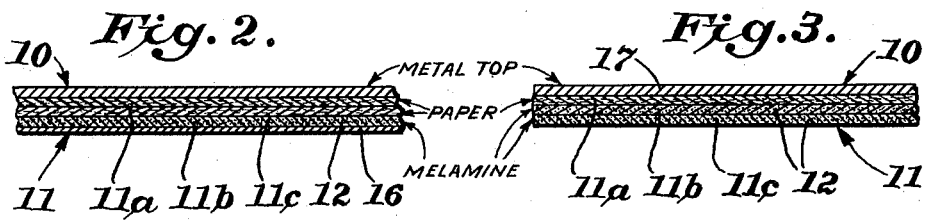
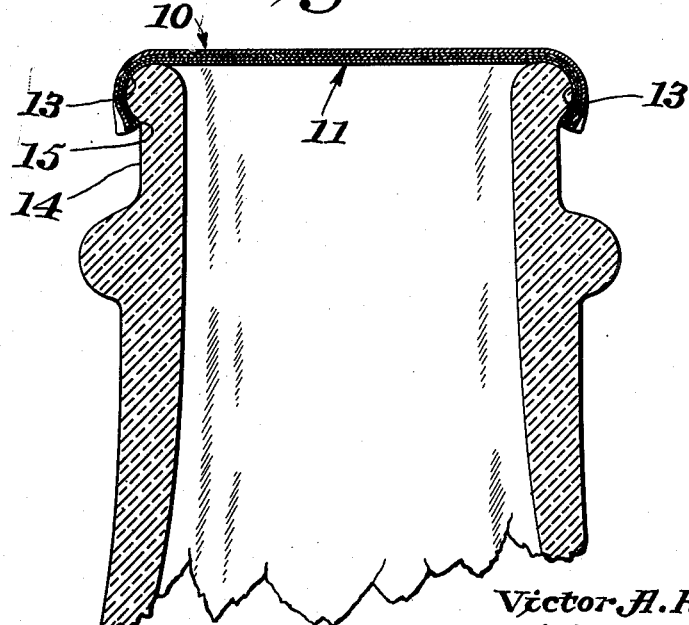
Inventors:
Victor A. Ryan,
William C. Kesler &
Charles W. Pimper, Jr.
By Cushman, Darby & Cushman
ATTORNEYS.

UNITED STATES PATENT OFFICE 2,554,639

CLOSURES

Victor A. Ryan, William C. Kesler, and Charles W. Pimper, Jr., Baltimore, Md., assignors to Crown Cork & Seal Company, Inc., Baltimore, Md., a corporation of New York Application November 1, 1948, Serial No. 57,806

2 Claims. (Cl. 215—40)

This invention relates to closures which are particularly useful for the sealing of glass containers, notably those used in connection with milk and dairy products.

The industry has for years been faced with a very serious problem, namely, the paper liners of such closures, for example, metal caps of the pressed-on type become tightly adhered to the glass surface. This sticking is caused by casein being deposited on the lip of the bottle or other container after the milk or other dairy product dries out. The adhesive action of the casein is so strong that upon prying off the cap, there is a tendency for the paper liner either in its entirety or partly, to remain stuck to the glass surface, rather than to come off cleanly with the cap shell.

This result is obviously objectionable, and in addition, creates an unsanitary condition as well as prevents use of the closure as a reseal.

Various means have been advanced for solving this problem. However, they have been so expensive as to be almost prohibitive, and, therefore, no really inexpensive solution of the problem has heretofore been available.

In the present invention, we use customary multiple-ply sheet liner material formed of cellulosic fibers, such as paper, but instead of coating or impregnating the already formed paper with anti-stick materials, we form the surface ply and adjacent surface plies in such a manner that the liner presents definite anti-sticking properties both with respect to the glass lip and to any residual casein deposited thereon, so that when the cap is pried off, the entire cap, including the liner, cleanly separates from the lip of the container. We accomplish our successful result by introducing a resinous anti-sticking agent into an aqueous suspension of the fibers to individually treat them before the paper web is formed. Such introduction of the anti-sticking agent may take place in the bearers or at any point prior to the final formation of the paper web, at which point the individual fibers are coated and impregnated with resin and preferably we introduce the agent in the head boxes of the usual cylinder or multiple head box Fourdrinier paper making machine. In this manner the outer ply or plies adjacent the exposed surface of the paper liner will be resin treated and the remaining ply or plies will be untreated so as to form a surface for adherence to the cap shell.

The agent which we have found to be highly successful after exhaustive tests is an aminoplast selected from the group consisting of melamine-aldehyde resin or urea aldehyde resin. The amount of the resin which is incorporated with the fibers is critical, particularly as to its lower limit, in that less than about 2% of resin by weight of the dry fibers is ineffective to obtain our results, while beyond about 5% or 6% of the resin does not produce any improved result and merely adds to the cost of the cap.

The melamine and urea aldehyde resins are prepared by condensing melamine or urea and an aldehyde, usually formaldehyde, to produce a polymerizable syrup which is diluted with water to about a 12% concentration for incorporation with the fibers, e. g., in the head box. In most cases, these resins are supplied in powder form, and are similarly diluted with water to produce the solution or diluted syrup for treatment of the individual fibers of the paper stock.

While we prefer a three-ply paper, with resin treatment in an outer or adjacent outer pair of plies, of course, papers having as many additional plies as necessary and treated to meet the requirements of the closure may be used, so long as one or more outer plies are left untreated for adherence to the inner surface of the cap shell. Also, a two-ply paper may be successfully used with resin treatment in one ply.

The resin introduced into the head box is thoroughly mixed with the fibers, whereby the individual fibers are impregnated or coated with the resin and when the sheet is formed, they adhere to the same so that the plies in which the resins have been introduced contain the resin uniformly throughout their thickness and area. The wet web is treated in the usual manner to dry the same, and to cure the resin to a relatively hard, water-insoluble state whereby the treated ply or plies exhibit the property of non-adhering either to a glass surface or to residual casein deposited on such surface.

Fibers which may be used in making up the web are ordinary soda pulp, rag pulp, sulphite pulp, sulphate pulp, etc. In some cases, ground wood may be used for the interior plies since it will reduce the expense of the paper, but in all cases the outer ply or the adjacent outer plies are preferably made of cellulosic fibers which will not impart either objectionable taste or odor. Mixtures of the various pulps may be used with the precaution of avoiding any possible impartation of objectionable taste or odor. Of course, one ply may be soda pulp, another of sulphate, and still another of sulphite, or, in fact, the plies may be made of any of the various pulps or mixtures thereof as long as the outer ply or outer adjacent plies are of a character which will not objectionably affect the contents.

In making the closures, a layer of cap shell material, e. g., metal has adhered to one surface, a layer of the multi-ply paper prepared as above described, preferably by adhering the same to the metal surface with a suitable adhesive, such as an ordinary casein adhesive. The ply of the paper which is adjacent to and abuts the metal surface for adherence thereto will, of course, not be treated with the resin, and the composite sheet cap material will, therefore, have the treated paper ply or plies exposed. The caps are stamped or punuched from this laminated structure, and for purposes of facilitating the stamping or otherwise forming the cap, the exposed surface of the cellulosic sheet may be provided with a thin wax film to assist in lubricating the action of the punching and stamping machines. This waxed coating, however, is not employed to prevent the sticking of the liner to the glass container lip, as this is the function of the ply or plies which have been uniformly treated and contain the resin as above described.

In our actual tests utilizing closures having paper liners, upon glass containers filled with milk and other dairy products, we have found that merely coating the exposed surface of the preformed paper liner material or impregnating the same with melamine or urea aldehyde resins does not impart to the surface ply or plies of the liner the required anti-sticking properties. On the other hand, when the resin is incorporated in the fibers so as to coat and impregnate them individually, and in the critical proportions mentioned above, prior to the formation of the wet web to provide a paper liner as herein described, we have been able to obtain successful resistance to sticking of the liner to the glass container lip and the cap including the liner separates cleanly from the lip.

It will be observed that by reason of this invention one of the chief stumbling blocks to the utilization of pressed-on closures having paper liners on containers for milk and dairy products has been effectively overcome. Moreover, the invention enables this result to be achieved at a cost which will popularize caps of this character.

As previously indicated, we have found it objectionable to have the resin present in the ply which faces the metal of the cap, since the resin interferes with suitable adherence of the paper to the metal by a cheap adhesive, such as casein. Moreover, we have found it objectionable to apply the resin to the already formed paper as by brushing, spraying, or otherwise coating and for several reasons. In the first place, it is difficult to control the degree of penetration when coating and uniformity of the resin throughout the coated surface is difficult to obtain because of the varying degrees of penetrability of different areas of the paper.

We are aware, of course, that paper stock has been mixed with resins such as melamine, but a multi-ply paper having less than the entire thickness penetrated has not been heretofore manufactured as far as we are aware except by the previously dimension objectionable coating method. Moreover, neither the coated paper, nor paper made from a stock having melamine present only in one or more of several plies and less than throughout the thickness of the paper have been used in closures. Furthermore, so far as we are aware, a multi-ply paper prepared from stock mixed with resin, such as melamine, whether the resin is present through the thickness or not has not been used in closures.

In the accompanying drawings:

Figure 1 is a perspective view of a cap of the pressed-on type having the improved liner disposed therein.

Figure 2 is a sectional view showing a three-ply liner wherein the resin is introduced in only the outer ply.

Figure 3 is a sectional view of a three-ply liner, wherein the resin is introduced in the adjacent exposed plies of the liner.

Figure 4 is a sectional view showing the cap in position upon the lip of a glass bottle.

Referring to Figure 1, the cap shell is indicated at 10 and is formed of any satisfactory metal, such as steel or aluminum and may even be made of paper having suitable stiffness. The liner is indicated at 11, and is adhered to the inside surface of the cap by means of any suitable adhesive, such as a casein adhesive.

Referring to Figure 2, the paper liner is formed of three interfelted, integral plies 11a, 11b and 11c. The ply 11c, which is the outer, exposed ply and which will contact with the glass lip surface, is prepared as above described and has the individual fibers thereof impregnated and coated with a melamine or urea aldehyde resin, as indicated at 12.

Figure 3 is similar to Figure 2, except that the resin 12 is introduced into both of the adjacent outer exposed plies 11b and 11c, as shown.

While we have illustrated a three-ply liner, as explained above, a two-ply liner may be, in some cases, used with the resin introduced in the outer or surface ply only, and, of course, cellulosic multi-ply liners of more than three plies may be employed, provided the resin is in the outer ply or the outer adjacent plies as shown in Figures 2 and 3.

Referring to Figure 4, the cap is shown as applied to the lip 13 of a glass bottle, such as a milk bottle. The cap is sealed upon the bottle by pressing it down over the lip, so that the free end of its skirt is located within the recess 14 in the lip and engages the underlying shoulder 15 thereof. It will be noted that the cellulosic liner is "overall," i. e., is co-extensive in area with the area of the cap shell, and the problem heretofore, as stated, has been to cleanly remove the entire cap assembly without having a portion, or all, of the cellulosic liner adhere to the glass lip surface, due to the adhesive effect of the casein deposited on the lip from milk or dairy products contained in the glass container. With the present invention, when the cap is pried off from the shoulder 15 of the lip of the glass surface there are no unsightly or unsanitary paper residues adhered to the lip. In fact, the cap may be reused as is customary with milk bottle caps to again seal the container.

Referring to Figure 2 of the drawings, the sheet liner material also includes a thin film of wax indicated at 16, which is preferably employed to lubricate the closure forming machinery and is not otherwise necessary.

Referring to Figures 2 and 3 of the drawing, the complete closure sheet material is illustrated in that the layer of metal or other cap shell material is shown at 17 adhered to one side of the paper liner. It is from this composite material that closures as shown in Figure 1 are stamped and formed.

We claim:

1. A closure comprising a shell having therein a liner of sheet material formed of cellulosic fibers, said liner having a plurality of plies, the fibers of the outer ply being individually coated with an aminoplast selected from the group consisting of melamine-aldehyde resin and urea formaldehyde resin and the fibers of the outer ply on the opposite side of the liner facing the shell being untreated with said aminoplast.

2. A metal closure comprising a shell having therein a linear of sheet material formed of cellulosic fibers, said liner having a plurality of plies, the fibers of the outer ply being individually coated with an aminoplast selected from the group consisting of melamine-aldehyde resin and urea formaldehyde resin, the resin being present in amount of about 2% to 6% by weight of the fibers in the said treated ply, the cellulosic liner being substantially co-extensive with the interior surface of the metal closure and the fibers of the outer ply on the opposite side of the liner facing the shell being untreated with said aminoplast.

VICTOR A. RYAN.
WILLIAM C. KESLER.
CHARLES W. PIMPER, Jr.

REFERENCES CITED

The following references are of record in the file of this patent:

UNITED STATES PATENTS

| Number | Name | Date |
| --- | --- | --- |
| 1,730,849 | Hinde | Oct. 8, 1929 |
| 1,732,958 | Warth | Oct. 22, 1929 |
| 2,139,572 | Booth | Dec. 6, 1938 |
| 2,234,457 | Strovink | Mar. 11, 1941 |
| 2,291,079 | Hofferbert | July 28, 1942 |
| 2,325,302 | Britt | July 27, 1943 |
| 2,394,289 | Boughton | Feb. 5, 1946 |
| 2,414,833 | Osborne | Jan. 28, 1947 |